United States Patent [19]

Luckenbach et al.

[11] 4,327,055
[45] Apr. 27, 1982

[54] CONTINUOUS CATALYST UNLOADING DEVICE

[75] Inventors: Edward C. Luckenbach, Mountainside; Arthur C. Worley, Mt. Tabor, both of N.J.

[73] Assignee: Exxon Research & Engineering Co., Florham Park, N.J.

[21] Appl. No.: 267,738

[22] Filed: May 28, 1981

Related U.S. Application Data

[63] Continuation-in-part of Ser. No. 108,558, Dec. 31, 1979, abandoned.

[51] Int. Cl.³ .................. B01J 4/00; B01J 8/18; F27B 15/08
[52] U.S. Cl. .................. 422/110; 138/149; 406/14; 406/28; 406/30; 406/193; 406/195; 422/112; 422/144; 422/219; 422/223
[58] Field of Search .......... 422/144, 219, 223, 241, 422/214, 242, 110, 112; 406/93, 94, 191, 193, 194, 195, 14, 28, 30; 138/149, 145; 208/152; 106/65

[56] References Cited

U.S. PATENT DOCUMENTS

| | | | |
|---|---|---|---|
| 3,149,924 | 9/1964 | Cross, Jr. | 422/219 |
| 3,475,326 | 10/1969 | Luckenbach | 422/214 |
| 3,494,858 | 2/1970 | Luckenbach | 422/144 |
| 4,063,344 | 12/1977 | Jones et al. | 138/149 |
| 4,208,214 | 6/1980 | Stein et al. | 106/65 |

*Primary Examiner*—Bradley Garris
*Attorney, Agent, or Firm*—Robert S. Salzman

[57] ABSTRACT

The present invention is for a continuous system wherein spent catalyst is removed from a regeneration vessel, while fresh catalyst is added in order to maintain proper catalyst activity in a hydrocarbon processive system. The withdrawal of the spent catalyst must be achieved at a steady flow rate which is compatible with the introduction of fresh catalyst of the hydrocarbon processing system. This flow rate is controlled by a downstream pressure and venting control in the spent catalyst hopper stage acting in conjunction with a novel flow restriction zone in a discharge conduit.

9 Claims, 4 Drawing Figures

4,327,055

CONTINUOUS CATALYST UNLOADING DEVICE

RELATED APPLICATION

This application is a continuation-in-part of previously filed U.S. Ser. No. 108,558; filed: Dec. 31, 1979, now abandoned.

BACKGROUND OF THE INVENTION

A. Field of the Invention

The catalytic cracking of hydrocarbons is performed in a tubular reactor wherein hydrocarbons to be processed are passed over particulate catalyst material to initiate the cracking process. Catalyst utilized in this process becomes contaminated with hydrocarbons and by-products of the cracking of hydrocarbons. Such catalyst is removed from the reactor, and, rather than being discarded, the catalyst is transferred to a regenerator. The catalyst can be regenerated in a fluidized bed regenerator vessel by subjecting the particulate catalyst to a oxidizing gas stream with release of heat. The regeneration process oxidizes carbon from the catalyst in order that the catalyst can be recycled through the hydrocarbon cracking reactor. The catalyst emanating from a fluidized bed regenerator vessel can be very hot and under high pressure. Such an environment is generally necessary for the regeneration process. The removal of regenerated catalyst under such conditions creates a problem of erosion due to pressure losses in the conduits emptying the regenerated catalyst. Various apparatus have been used to control such unloading of catalyst regenerators. Such apparatus have suffered from the attendant problems of apparatus erosion caused by the hot, reactive, particulate catalysts used in hydrocarbon cracking processes and the losses of fluidization in the regenerator catalyst beds due to equipment deterioration under such an erosive environment.

B. The Prior Art

The prior art has attempted to provide various solutions to the problems in recycling of cracking catalyst and its removal from regenerating vessels. These concepts have incorporated the use of various valves, piping arrangements and multiple flow paths.

In U.S. Pat. No. 3,342,561, Pohlenz et al., a catalytic hydrocarbon furnace is disclosed which has a circuitous flow path for catalyst discharging from the reactor portion of the furnace downwardly to the lower portion of a regenerator section. At that point, the regenerating catalyst is fluidized upwardly through the section and separated in a cyclone separator, before re-entering the furnace reactor. This patent fails to provide a reservoir for the catalyst and is dependent upon precise flow of the catalyst at all times. In addition, pressure conditions within the reactor are dependent upon the valve control of the carbonized catalyst return conduit to the regenerator section. Erosion problems are attendant with such a valve system.

In U.S. Pat. No. 3,904,548, Fagan et al., a hydrocarbon reactor and catalyst regenerator system is demonstrated, which provides a direct downward flow of regenerated catalyst to a reactor. The catalyst flows upward through the reactor and re-enters the regenerator by gravity. The catalyst flow from the regenerator to the reactor is controlled by a valve. Such a system fails to provide a separation of the pressurized, fluidized zones of the regenerator and reactor. In addition, the supply of catalyst to the reactor is dependent upon the operation of a valve, which is subject to the characteristically erosive conditions of hot fluidized catalyst.

In another patent, U.S. Pat. No. 3,964,876 to James, a regeneration system is disclosed which has a multiplicity of return conduits for providing regenerated catalyst to a vertical, tubular hydrocarbon reactor zone. The return conduits are designed with a downward gravity flow directly to the reactor zone, which is controlled by valves placed on the respective flow paths. Such a system requires that the control of catalyst flow depends entirely on typical valving which is subject to erosive conditions and provides only direct supply of catalyst material from the regenerator to the hydrocarbon reactor.

In U.S. Pat. No. 3,494,858 to Luckenbach, a regenerator-reactor system is provided which utilizes a catalyst settling zone and a downwardly curved conduit flow path for catalyst transported from the regenerator to the reactor and back again. The load of catalyst in this system is held in the downwardly flowing zone. Gas is added to the midpoint of this zone and not the bottom of this zone. This is done in order to maintain a high density of flowing catalyst so as to produce efficient regeneration thereof.

The present system by contrast is not a catalyst regeneration system as taught by Luckenbach but rather a continuous catalyst unloading system, i.e. a system which rejects the spent catalyst. As a result, the spent catalyst is not recycled, and there is no teaching in the Luckenbach patent that a special downstream pressure control is necessary in order to maintain an equilibrium between fresh catalyst loading and spent catalyst unloading as is necessary in the present invention. Presented in another way, the present system controls the pressure in a spent catalyst hopper in order to vent the carrier air, while settling the spent catalyst. This pressure control is manifested in conjunction with a novel upstream restriction zone, such that a steady catalyst unloading flow rate may be maintained. In addition, the present invention uses the restriction zone as a fluid seal during spent catalyst conveyance from one vessel to another. Also, the slow curved piping in the discharge conduit does not experience erosive wear due to the hot discharged catalyst, because of the refractory lining of the restriction zone. Thus, the restriction lining has a novel dual purpose which is not shown in Lukenbach.

Other prior art patents of general relevance to regenerated catalyst flow systems include U.S. Pat. No. 3,149,924, Cross, Jr.; U.S. Pat. No. 3,617,496, Bryson et al.; and U.S. Pat. No. 3,886,060, Owen.

SUMMARY OF THE INVENTION

The present invention is directed to a regenerated catalyst conveyance system which overcomes the problems inherent in such prior art catalyst systems as identified above and which achieves the continuous controlled flow of catalyst which the prior art efforts have specifically failed to provide.

The present invention is for a continuous system wherein spent catalyst is removed from a regeneration vessel, while fresh catalyst is added in order to maintain proper catalyst activity in a hydrocarbon processing system. The withdrawal of the spent catalyst must be achieved at a steady flow rate which is compatible with the introduction of fresh catalyst to the hydrocarbon processing system. This flow rate is controlled by a downstream pressure and venting control in the spent catalyst hopper stage acting in conjunction with a novel flow restriction zone in a discharge conduit.

The continuous catalyst regeneration system comprises:

(a) a regeneration vessel, (b) a spent catalyst hopper, (c) a discharge conduit for removing catalyst downwardly from said vessel, said discharge conduit having a bent portion in a lower end thereof, (d) valve means disposed in a mid-portion of said conduit for closing said discharge conduit, (e) a substantially vertically oriented carrier pipe connected to the top of said bent portion of said discharge conduit for conveying catalyst from said discharge conduit to said hopper, said carrier pipe having a dual purpose refractory lining therein, which reduces the internal diameter thereof to provide a catalyst flow restriction zone and for providing said restriction zone with an erosion resistant inner surface;

(f) fluidization means connected to a bottom section of said discharge conduit for introducing fluidization air into said carrier pipe at a substantially constant flow rate for facilitating the conduction of catalyst material through said carrier pipe, (g) a transport pipe connected between said carrier pipe and said hopper, (h) means for introducing carrier and cooling air into said transport pipe, and (i) a pressure control means disposed downstream of said restriction zone controlling in combination with said restriction zone the flow rate of the catalyst and air to said spent catalyst hopper, said pressure control means venting said air as said spent catalyst settles in said hopper.

It is an object of this invention to accomplish the direct withdrawal of spent catalyst from a fluidized bed regenerator vessel in a continuous manner without the normally attendant problems of erosion and equipment failure, which have plagued the prior art systems.

It is another object of the invention to provide a continuous spent catalyst unloading system wherein the withdrawal of spent catalyst is achieved on a steady flow basis compatible with the addition of fresh catalyst to a regeneration vessel in order that catalyst activity can be maintained in a hydrocarbon cracking system.

It is an object of the present invention to preserve pressurized conditions in the regenerator vessel during continous catalyst removal by the use of a system incorporating integral pressure restriction means without the necessity for sole reliance on erodable valves to effect a pressure drop.

Another object of the present invention is to provide a special refractory conduit for the regenerated catalyst flowpath, which eliminates moving parts and utilizes a cast-in-place refractory lining for the conveyance of catalyst, which conduit is reinforced with metallic wire fibers.

It is yet another object of the present invention to utilize right angle conduit joints in the conveyance system where a change in the conduit flowpath is necessary.

A further object of the present invention is to prevent erosion of the pressure restriction portion of the catalyst conveyance system by use of a refractory lining, which is made and maintained by simple cast-in-place techniques.

These objects and others are achieved by a conveyance system for removing particulate catalyst from the fluidized bed of a regenerator vessel with a downwardly directed discharge conduit which leads from the lower portion of said vessel and is connected at its lower end to a vertical, refractory lined pipe, which is aligned with a fluidization means for conveying particulate catalyst through said refractory lined pipe.

The discharge conduit is of a relatively large diameter in order to prevent catalyst plugging of the conveyance system. A gate valve is located within this conduit. The valve is used to close the conveyance system during shutdown of said system, but its operation is not necessary for the control of regenerated catalyst flow. Nor is the valve required to maintain the pressure of the regeneration vessel's fluidized bed.

Control of catalyst flow in the present invention is performed by the fluidization means aligned with the substantially vertical oriented refractory lined pipe, while the pressure level of the system is maintained by the reduced internal diameter of the pipe created by the refractory lining. Because the refractory lining of said pipe functions as the pressure restriction for the conveyance system, with the attendant stress of extreme heat and erosion conditions, it is provided with metallic fiber wire reinforcement consisting of short lengths of fine metal fibers.

The refractory lined pipe is connected at its downstream end to appropriate conduits which transport the catalyst to a spent catalyst hopper for recirculation to the hydrocarbon reactor. The conveyance system provides for pressure control of the regenerator vessel by a restrictive vertical flow path which is resistant to the erosive environment of fluidized catalyst and which is easily repaired and maintained by the casting of reinforced refractory material.

According to the present invention, spent catalyst is drawn off the main vessel in a fluidized leg and only a small amount of gas is supplied at the bottom of this leg to fluidize the catalyst and permit classification of the larger particles and tramp material. This unwanted material will settle to the bottom of this leg and can be removed periodically since the leg is provided with double block valves from the main vessel. The catalyst take off orientation is arranged with the small diameter part of the refractory filled line disposed so that catalyst is drawn off vertically upward or upward. This arrangement will prevent larger particles that come into the fluidized leg from settling on the entrance opening and plugging it, or if a particle happens to be lifted into the opening and plugs it, a simple back pressure will remove it. The particle will fall down into the lower fluidized leg which has sufficient volume to collect such particles. The air pick up stream downstream of the refractory section is relatively large and is supplied in sufficient quantity to quench the temperature of this catalyst so that relatively lower grade metallurgy, e.g. carbon steel, can be used in the line.

BRIEF DESCRIPTION OF THE DRAWINGS

The invention is specifically exemplified by the drawings which are described below.

DETAILED DESCRIPTION OF A PREFERRED EMBODIMENT OF THE INVENTION

Figures 1, 2:
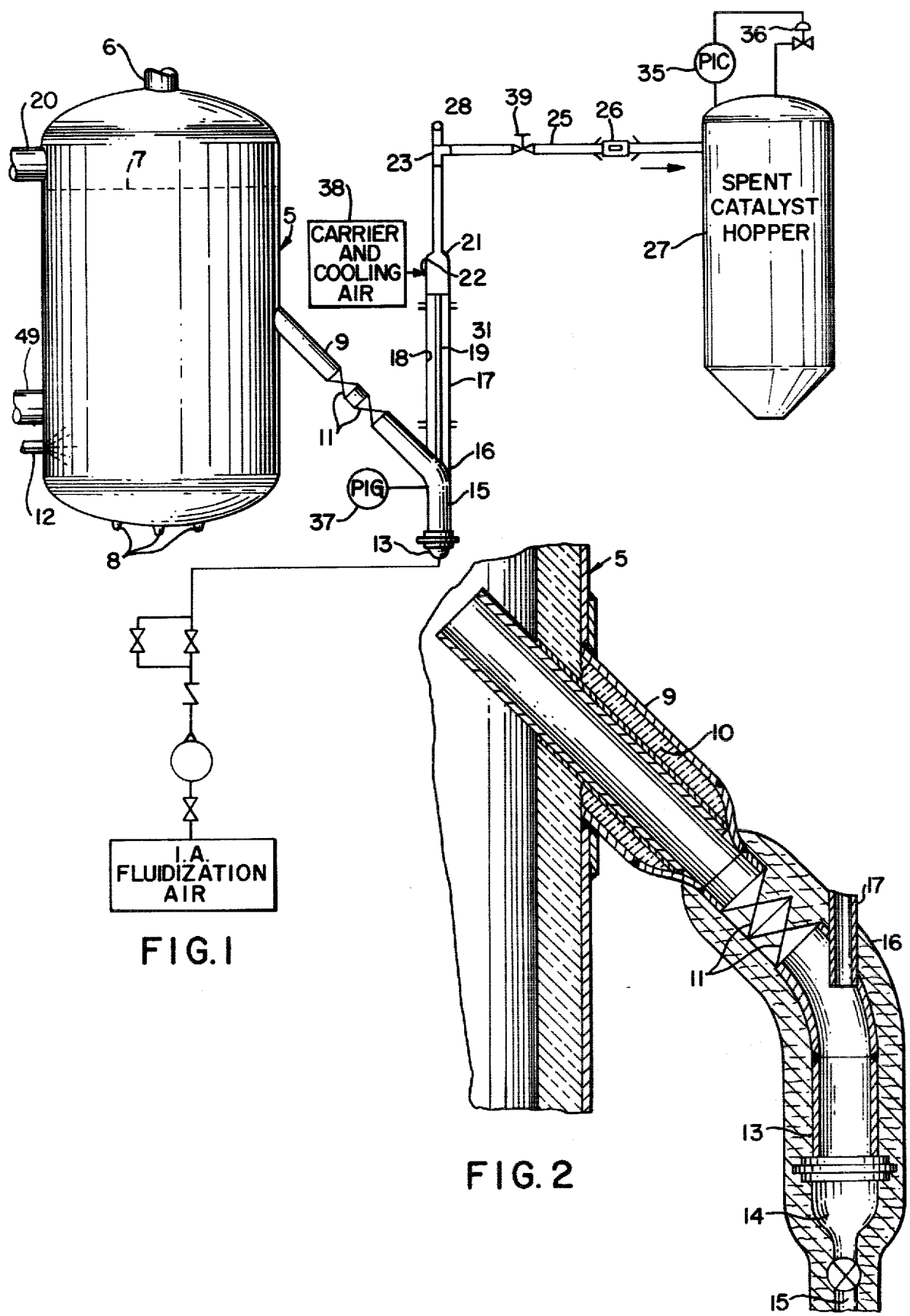
FIG. 1 is a schematic vew of a catalyst conveyance system utilizing the instant invention therein.
FIG. 2 is a partial cross-sectional plan view depicting the discharge conduit and gate valve of the system shown in FIG. 1.

FIG. 1 shows a catalyst regenerator vessel 5 consisting of a large container which typically has an appropriate array of gas fluidization nozzles 8 and venting stacks 6 in order to maintain a fluidized bed of catalyst to be regenerated. The regenerator vessel also can have appropriate burners 12 for heating the catalyst, as well as a supply conduit 20 for introducing the catalyst to the vessel. These components can be of any applicable type and, because they do not form a part of the invention herein, they are not described in detail.

The catalyst being regenerated in the vessel 5 can be any particulate catalyst used in hydrocarbon cracking processes. The typical catalysts consist of the zeolites and other alumina silicate substrates having a high surface area due to their inherent rough, or porous physical dimensions. Such substrates become clogged or coated with carbon during the course of their catalytic use in the cracking of various hydrocarbons. When the catalyst bodies become clogged with such carbon, they lose their efficiency in the hydrocarbon cracking process and must be replaced with fresh catalyst.

Because the catalyst material is of considerable economic value, it has become the practice to regenerate the catalyst which is being removed from the hydrocarbon cracking reactor. The catalyst can be regenerated by subjecting it to a heated, oxidizing environment which removes the hydrocarbon residues which have become adhered to the surface of such catalyst. Regenerated catalyst leaves through conduit 49 connected to reaction vessel (not shown).

Therefore, in the complete processing of hydrocarbons in cracking reactions, the use of a circuitous flow of catalyst to and from the hydrocarbon cracking reactor itself is used. The catalyst cycles from the cracking reactor to a regeneration vessel and back again. However, the specific flow of catalyst must be regulated depending on a number of independent factors. These factors include the quality of the hydrocarbon being processed, the desired end product, the particular catalyst being utilized and the amount of regeneration time required to return the catalyst to its active state.

The catalyst is controlled and stored by gate valves and catalyst reservoirs utilized within the conveyance system in order to maintain catalyst flow and catalyst capacity when the catalyst is not immediately needed or in a condition to be utilized in the hydrocarbon reactor. The fluidized bed regeneration vessel 5 shown in FIG. 1 is well suited to both storing quantities of catalyst to be regenerated and providing the necessary environment for the regeneration of large quantities of catalyst at one time.

The regeneration of catalyst in the vessel 5 requires pressurized conditions up to 200 psi and elevated temperatures of 800° to 1400° F. Catalyst, which is maintained at these conditions, presents problems in its removal when spent and conveyed to storage. The present catalyst is highly erosive to the apparatus with which it comes into contact due to its generally hard particulate nature and the conditions of elevated temperature and pressure which exist in the regeneration vessel and any apparatus communicating therewith. It is essential to provide conveyance apparatus which withstands such conditions, and yet, preserves the pressurized conditions of the regeneration vessel's fluidized bed, provides control over the flow of the regenerated catalyst, and maintains catalyst activity in the regeneration vessel 5.

In the present invention, as shown in FIG. 1, a discharge conduit 9 is connected at the lower portion of the regeneration vessel 5 so that it can remove spent catalyst by gravity flow of said catalyst. The specific location of the discharge conduit 9 is not critical as long as it is substantially below the upper level of the fluidized bed 7 of the regeneration vessel.

A pair of gate valves 11 are located in the discharge conduit 9 so that the vessel 5 can be shut off from the downstream portion of the conveyance system. The discharge conduit descends downwardly away from the regeneration vessel and ends at the conduit terminus 13. A fluidization nozzle 15 is situated at the terminus 13 with its fluid stream directed upwardly in the lower section of the discharge conduit, which lower section is aligned in a generally vertical plane. A pressure indicator gage 37 is situated at the bend in the discharge pipe 9.

A vertically aligned carrier pipe 17 intersects and communicates with the discharge conduit 9 at a junction 16 directly above the flow path of the fluidization nozzle 15. The carrier pipe is specifically designed with a substantial vertical run or length, so as to provide control over the flow rate of catalyst and the pressure conditions of the system. The carrier pipe 17 is fitted with a cast-in-place refractory lining 19, which significantly reduces the effective internal diameter of the carrier pipe bore 18. These features of a reduced bore and a substantial vertical length creates a restriction zone which gives the carrier pipe 17 the ability to control spent catalyst flow, as well as to provide a pressure drop utilized to preserve pressurized conditions in the regeneration vessel 5. The carrier pipe head 21 has a carrier nozzle 22 which supplies supplemental fluidizing air. In addition, being vertically oriented with catalyst flow being upward, heavier materials and debris will not plug into the line as gravity will tend to separate these materials from the upflowing catalyst. This air stream assists the air stream from nozzle 15 in fluidizing and carrying the particulate catalyst along the conveyance system.

The carrier pipe 17 terminates in an elbow joint 23, which is designed to effect a right-angle turn in the flowpath of the carrier pipe. Such a turn creates a greater pressure drop and is less susceptible to erosion than less-angled conduit turns. The conveyance system continues with a catalyst conduit 25 of minimal length. The catalyst conduit 25 includes a sight glass 26 to allow visual inspection of line conditions and a shut-off valve 39. The conduit terminates as a spent catalyst hopper 27. The air entering hopper 27 is vented via valve 36. A pressure indicator control 35 senses the pressure in the hopper 27, and controls valve 36. This downstream control 35 acts in conjunction with the aforementioned restriction zone, to maintain a steady flow rate of spent catalyst from vessel 5 to hopper 27, so that proper catalyst activity may be maintained in regeneration vessel 5. The pressure control 35 can be set with reference to the pressure indication shown by gauge 37.

Referring to FIG. 2, details of the discharge conduit 9 and the regeneration vessel are shown. The discharge conduit 9 is, preferably, a six inch diameter pipe which exits the regeneration vessel at a 45° angle downwardly from the horizontal plane. The conduit has insulation 10 on the upper length of the outer surface. Two gate valves 11 are situated in the flowline of the discharge conduit above the junction 16 of the vertical carrier pipe 17. The valves can be 6 inch gate valves with stellited internal hardsurfacing. The discharge conduit terminates with a reduced neck 14 substantially below the junction of the carrier pipe. A fluidization nozzle 15 is located at the terminal end of the discharge conduit. This nozzle supplies a gas stream which is directed vertically toward the lower end or junction of the carrier pipe. Therefore, it is necessary that the section of the discharge conduit from the carrier junction 16 to the discharge conduit terminus 13 be a generally vertical, straight portion of pipe.

The fluidizing gas from the nozzle 15 catches the gravity fed catalyst in the discharge conduit and carries it in a fluidized condition upwardly through the carrier pipe 17.

Figure 3:
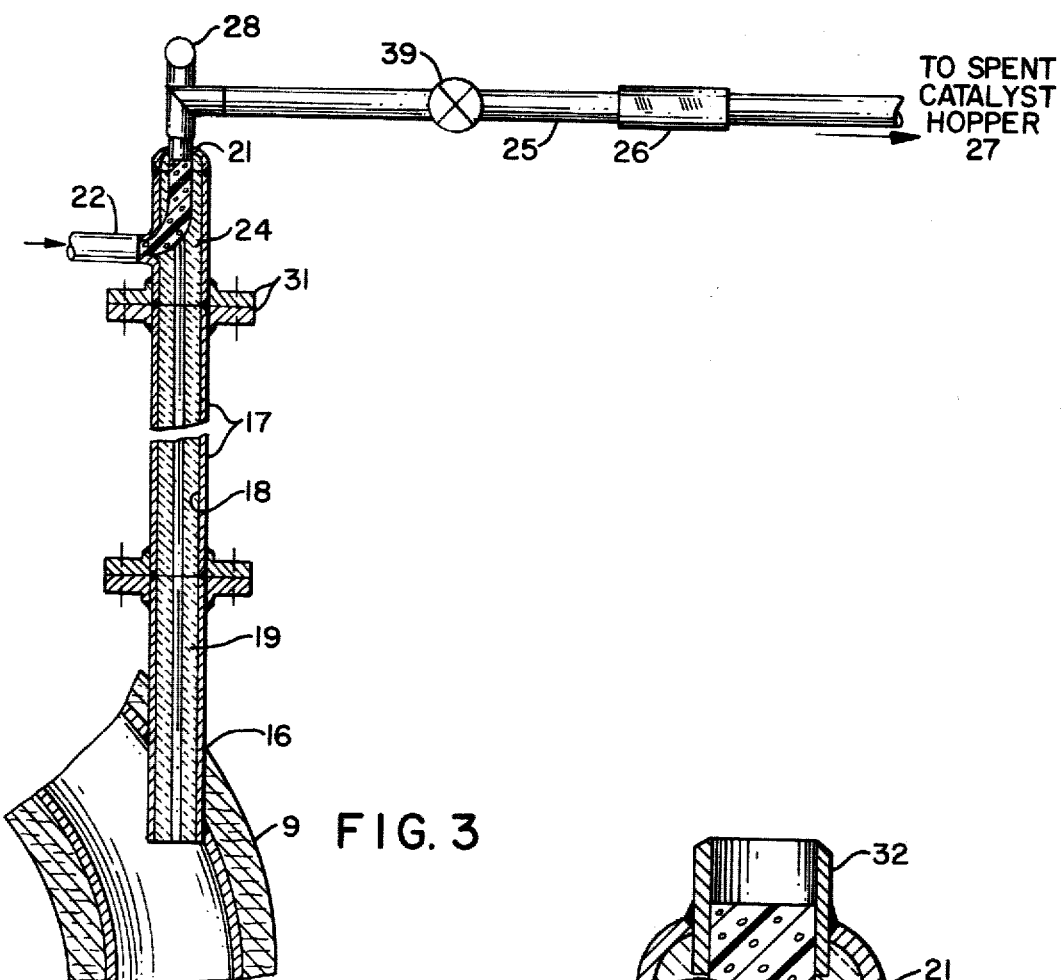
FIG. 3 is a partial cross-sectional plan view depicting the vertical refractory lined pipe of the system shown in FIG. 1.

Referring to FIG. 3, the carrier pipe 17 is shown with its junction 16 with the discharge conduit 9 and the catalyst conduit 25 which supplies a spent catalyst hopper 27. The carrier pipe 17, is preferably, a 3 inch pipe, which is not provided with external insulation as is the case in the discharge conduit 9. The carrier pipe is lined with a cast-in-place refractory material 19. The refractory is reinforced with short lengths of metal wire fibers, which are incorporated into the refractory in the plastic state, prior to casting and curing. The refractory lining 19 reduces the diameter of the carrier pipe bore 18 to 0.375 inches. The sections of the carrier pipe are connected by exterior flange members 31 which can be bolted together.

A carrier pipe head 21 is located at the upper end of the carrier pipe. This head includes an auxiliary air supply for fluidization and carrying of the regenerated particulate catalyst. The air or fluid is provided by carrier nozzle 22. This carrier air is of sufficient quantity to cool the hot catalyst to a point where carbon steel metallurgy is satisfactory. This nozzle originates in an internal area within the carrier pipe of increased diameter. This enlarged bore of the carrier pipe provides for rapid conveyance of the catalyst with minimal frictional drag. The function of pressure retention is accomplished by the lower portion of the carrier pipe with its reduced diameter and vertical length and thus continued restriction of the bore is not necessary.

The carrier pipe head connects with a right-angled elbow joint 23 which has an overall "tee" shape and an access means consisting of a pipe cap 28. This cap allows for maintenance of the carrier pipe and its refractory lining. The elbow joint communicates with a length of unlined pipe consisting of a catalyst conduit 25 having a sight glass of typical design. The catalyst conduit 25 terminates at a spent catalyst hopper 27 which consists of a vessel for retaining quantities of the regenerated catalyst. The catalyst can be drawn from said hopper as needed to replenish the hydrocarbon cracking reactor, which would be utilized with the conveyance system of this invention.

Figure 4:
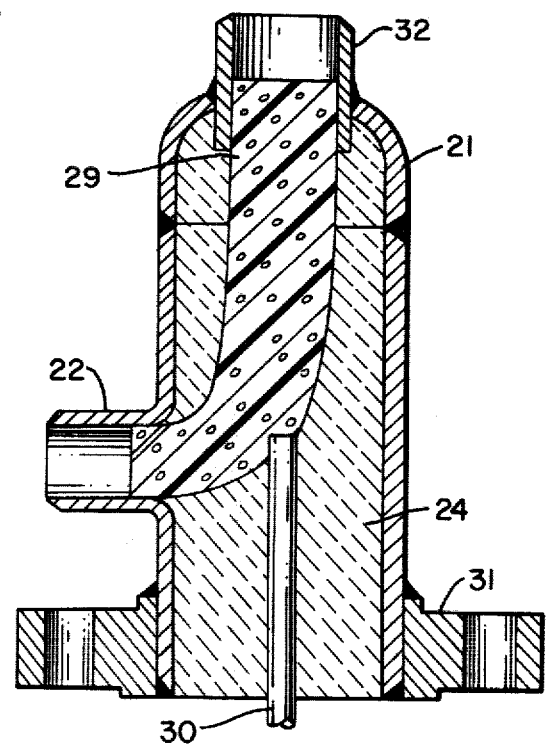
FIG. 4 is a partial cross-sectional view of the upper portion of the pipe of FIG. 3.

As shown in FIG. 4, the head of the carrier pipe 17 ends with a pipe stub 32. This stub provides a means for connecting the downstream portion of the conveyance system to the carrier pipe. The stub 32 is not refractory lined and, in fact, marks the end of the refractory lined section of the system. As indicated in the drawing, the refractory material can be cast-in-place with the assistance of Styrofoam or plastic forms 29, 30, which simulate the bore of the carrier pipe in the main vertical length and the carrier nozzle area, respectively.

As stated above, the present invention utilizes the reduced diameter, refractory lined carrier pipe with its vertical flowpath to control catalyst flow and pressurization conditions. This is in contrast to the prior art devices, which utilize various valves for such control. The gate valves 11 of the present invention are not needed to control such functions, but are incorporated into the system for complete shutdown and for maintenance and emergency conditions. Erosion problems, particularly of the valves, are avoided by this system, which utilizes reinforced refractory lining of a simple construction for erosion resistance and as a flow restrictive element.

The refractory material is a hydraulic grade refractory typically having an alumina content in the range of 45–95% by weight and a water content in the range of 10.3–10.8% by weight. The refractory can be cast at a temperature of from 60°–90° F. After curing and dryout, the refractory should have a cold crushing strength of 5,000 to 10,000 psi.

The metal wire fibers which are added to the refractory during the mixing of the refractory prior to casting, are selected from the group comprising: 18/8 chrome-nickel alloy, 25/20 chrome-nickel alloy, 25/12 chrome-nickel alloy, 26 chrome alloy and carbon steel, depending on the conditions expected in the catalyst conveyance system. The metal wire fibers are added to the refractory in quantities of 5–10 lbs. per cubic foot of refractory. The metal fiber is sized so that it is in the range of 0.010"–0.016" diameter by 0.075"–1.0" in length. Reference is made to U.S. Pat. No. 3,429,094 for further disclosure of suitable metal fiber-reinforced refractory material for use with present invention.

The carrier pipe 17 is constructed by assembling the desired lengths of 3" flanged pipe into one continuous length. A pipe head 21 is then welded on the downstream end of the carrier pipe. Styrofoam or plastic forms 29,30 are positioned within the bore 18 of the pipe. The form 30 for the reduced bore of the pipe's greater length is placed axially within the center of the bore. The form 29 for the carrier gas fluidization nozzle 22 is affixed within the aperature in the carrier head 21 for said nozzle and additionally is arranged so as to define the axial bore of the downstream end of the carrier pipe. The forms are chosen so that the latter form 29 prvides an enlarged bore for the carrier pipe with respect to the form 30 which defines the greater portion or upstream area of the carrier pipe bore.

Metal wire fibers are then mixed with an appropriate refractory material. The refractory material is packed in the bore of the carrier pipe and carrier head so as not to alter the alignment of the Styrofoam or plastic forms 29,30. After the setting of the refractory material, the forms can be removed by any practical method, including, but not limited to the head destruction of said forms. The carrier pipe is then finished by incidental sanding or filing of the rough portions of the cast-in-place refractory.

The invention has been described above with respect to a specific preferred embodiment. Obvious changes or modifications can be made by one skilled in the art without departing from the intended scope of the invention, which is defined by the following claims, which should not be limited to their literal terms, but should be construed in a manner commensurate with the breadth of the instant invention.

What is claimed is:

1. A continuous catalyst regeneration system for use in a hydrocarbon processing system comprising:
   (a) a regeneration vessel;
   (b) a spent catalyst hopper;
   (c) a discharge conduit for removing catalyst downwardly from said vessel, said discharge conduit having a bent portion in a lower end thereof;
   (d) valve means disposed in a mid-portion of said conduit for closing said discharge conduit;
   (e) a substantially vertically oriented carrier pipe connected to the top of said bent portion of said discharge conduit for conveying catalyst from said discharge conduit to said hopper, said carrier pipe having a dual purpose refractory lining therein, which reduces the internal diameter thereof to provide a catalyst flow restriction zone and for providing said restriction zone with an erosion resistant inner surface;
   (f) a fluidization means connected to a bottom section of said discharge conduit for introducing fluidization air into said carrier pipe at a substantially constant flow rate for facilitating the conduction of catalyst material through said carrier pipe;
   (g) a transport pipe connected between said carrier pipe and said hopper;
   (h) means for introducing carrier and cooling air into said transport pipe, and
   (i) a pressure control means disposed downstream of said restriction zone controlling in combination with said restriction zone the flow rate of the catalyst and air to said spent catalyst hopper, said pressure control means venting said air as said spend catalyst settles in said hopper.

2. The system of claim 1 wherein said introducing means is disposed in the upper end of said carrier pipe and includes a nozzle for the infusion of a carrier gas into the carrier pipe as well as the transport pipe.

3. The system of claim 1 wherein the inside diameter of said carrier pipe lining increases at its upper end to facilitate transport of the catalyst and carrier gas from the carrier pipe to the spent catalyst hopper.

4. The system of claim 1, wherein said refractory lining comprises a hydraulic refractory material having an alumina content in the range of 45–95% by weight which is cast-in-place.

5. The system of claim 1 wherein said refractory lining is reinforced with fine metal wire fibers prior to casting said refractory lining into the carrier pipe.

6. The system of claim 5 wherein the fine metal wire fibers comprise 5–10 pounds of wire per cubic foot of refractory of wire selected from the range of 0.010"–0.016" diameter by 0.075"–1.0" long.

7. The system of claim 5 wherein said wire fibers are selected from the metal group consisting of: 18/8 chrome-nickel; 25/20 chrome-nickel; 25/12 chrome-nickel; 26 chrome and carbon steel.

8. The system of claim 1 wherein the carrier pipe terminates at its upper end with a tee-section elbow joint and an access cap so that entry is available to the bore of said pipe and so that a right angle flow path is provided in the catalyst transport pipe.

9. The system of claim 1 wherein the carrier pipe refractory lining is erosion and temperature resistant.

* * * * *